United States Patent [19]

Canu et al.

[11] Patent Number: 5,257,319
[45] Date of Patent: Oct. 26, 1993

[54] CHARACTER RECOGNITION APPARATUS

[75] Inventors: Jeane Pierre Canu, Yvetot; Bernard Desforges, Darhetal; Gerard Heutte, Rouen, all of France

[73] Assignee: Unisys Corporation, Blue Bell, Pa.

[21] Appl. No.: 689,080

[22] Filed: Jun. 14, 1991

[30] Foreign Application Priority Data

Oct. 24, 1989 [GB] United Kingdom ............... 8923960

[51] Int. Cl.⁵ .................................................. G06K 9/00
[52] U.S. Cl. ........................................ 382/7; 382/29; 382/64
[58] Field of Search ............... 382/7, 64, 29; 235/449

[56] References Cited

U.S. PATENT DOCUMENTS

| | | | |
|---|---|---|---|
| 3,316,536 | 4/1967 | Andrews et al. | 382/7 |
| 3,528,058 | 9/1970 | Bond | 382/7 |
| 3,987,411 | 10/1976 | Kruklitis et al. | 382/7 |
| 4,143,355 | 3/1979 | MacIntyre | 382/7 |
| 4,148,010 | 4/1979 | Shiau | 382/7 |
| 4,245,211 | 1/1981 | Kao | 382/7 |
| 4,356,472 | 10/1982 | Hau-Chun et al. | 382/64 |
| 4,797,938 | 1/1989 | Will | 382/7 |

*Primary Examiner*—Herbert Goldstein
*Assistant Examiner*—Steven P. Klocinski
*Attorney, Agent, or Firm*—John B. Sowell; Mark T. Starr

[57] ABSTRACT

A character recognition apparatus uses a magnetic head to read magnetic printed coded characters from a passing cheque 10. A head 24 using a circuit including a delay line 58 drives a controller 76 which, should a character not instantly be recognized by matching against templates, first varies the presumed speed by plus or minus 10% to see if a match can be found, then suppresses each detected edge in the character, in turn, to determine whether or not a match can be found. Each edge is used to create subsequent timing windows wherein a subsequent edge may be detected. The use of timing windows suppresses erroneous edge detection.

12 Claims, 9 Drawing Sheets

CHARACTER RECOGNITION APPARATUS

The present invention relates to an apparatus for recognising characters. It particularly relates to an apparatus for detecting characters, on a document, deriving the signal representative thereof, and comparing the derived signals with stored values to recognise a represented character.

The process of recognising characters on a document is variously employed for document processing. A document may be scanned optically, magnetically, or in any other way to derive signals representative of the image presented to a sensor. The electrical signals are then processed and compared with templates to determine the identity of each character, presented to the sensor.

The speed and efficiency of a machine, using automatic character recognition, is heavily dependant upon the accuracy and reliability of character recognition. It is common to stop a machine and indicate, to an operator, uncertain characters for the operator to correct uncertain characters via a keyboard. The rate of document processing is therefore greatly slowed. It is thus desirable to provide means for identifying characters which are otherwise uncertain using apparatus available in the prior art.

The present invention is hereinafter described with reference to use in a cheque sorting machine. It is to be understood that the present invention is not limited thereby, but may equally be applied to any other form of character recognition apparatus where characters are scanned and identified. Equally, the present invention is hereinafter described with reference to a particular character set, to be identified on passing cheques. It is to be appreciated that the present invention is equally applicable to other character sets. Lastly, the present invention is hereinafter described with reference to use with magnetic printed characters on a cheque. It is to be appreciated that the present invention is not limited to magnetic characters, but may equally be applied to any character where an electrical signal representation of the character, as hereinafter described, may be derived in any way.

The present invention consists in an apparatus for identifying a scanned character from among a pre-determined set of characters, said apparatus comprising: an edge detector for detecting and providing output indicative of the position of edges in the scanned character; a level detector for detecting and providing output signals indicative of the polarity and the rate of change of intensity of the scanned character with position; a controller operative to create a character record including the position of each edge and the polarity of said rate of change of intensity of each edge; said controller comprising a stored set of character signals (templates), each representative of the character record for a respective one of the characters in said pre-determined set of characters; said controller being operative to compare the character record with each character signals template and to provide an indication of that character, from said set, with whose template the character record matches.

In order to allow this automatic identification of characters, the present invention also provides that the controller, should no template be found to match the character record, is operative to apply a correction to the position of edges in the character record on the assumption of a pre-determined amount of mis-positioning of the edges in the character record to provide a modified character record; the controller being operative thereafter to compare the modified character record with each template and to provide indication of the character, from the set, with whose template the modified character record matches.

In order further to improve automatic identification of characters, the present invention further provides that, should no template be found to match either the character record or the modified character record, the controller is operative to suppress, in turn, each edge in the character record to create a set of a first type of altered character records; the controller being operative to compare each first type of altered character record with each template, to store indication of those templates with which a match is found, to provide indication of any character, from said set of characters with whose template there is found to be the only match, and to provide indication of no match being found if no template is found to match or if more than one template is found to match. The present invention provides that the suppression of each edge in turn may be applied either to the character record or to the modified character record.

In order to overcome noise and other erroneous signals from the document, the present invention yet further provides that the controller is operative, on detection of a first edge of the scanned character, to calculate a first positional window wherein a second edge may properly be found; the controller acknowledging as a confirmed second edge only a second edge which is detected within an accepted positional window.

In order yet further to improve the accuracy of character recognition, the present invention provides that the controller is operative to use the detected position of each edge in the scanned character as a starting point for calculating subsequent positional windows wherein a subsequent edge may properly be located; a next subsequent edge being acknowledged as a confirmed subsequent edge if and only if it falls within a subsequent positional window.

The present invention further provides that, when creating and recalculating modified or altered character records, the controller recalculates the positional windows and acknowledges all edges found to be in the recalculated positional windows.

For preference, the present invention is embodied detecting characters printed upon a document, moved past a sensor at constant speed. For preference the sensor is magnetic.

The present invention provides an edge detector circuit comprising a logic comparator, coupled to receive a representation of the instant intensity of the scanned character, coupled to receive a delayed representation of the instant intensity of the scanned character, and operative to provide a logical output, indicative by polarity of the sense of the instant difference between said representation of the intensity of the scanned character and said delayed representation of the instant intensity of the scanned character.

The present invention is further explained, by way of example, by the following description read in conjunction with the appended drawings, in which.

Figure 1:
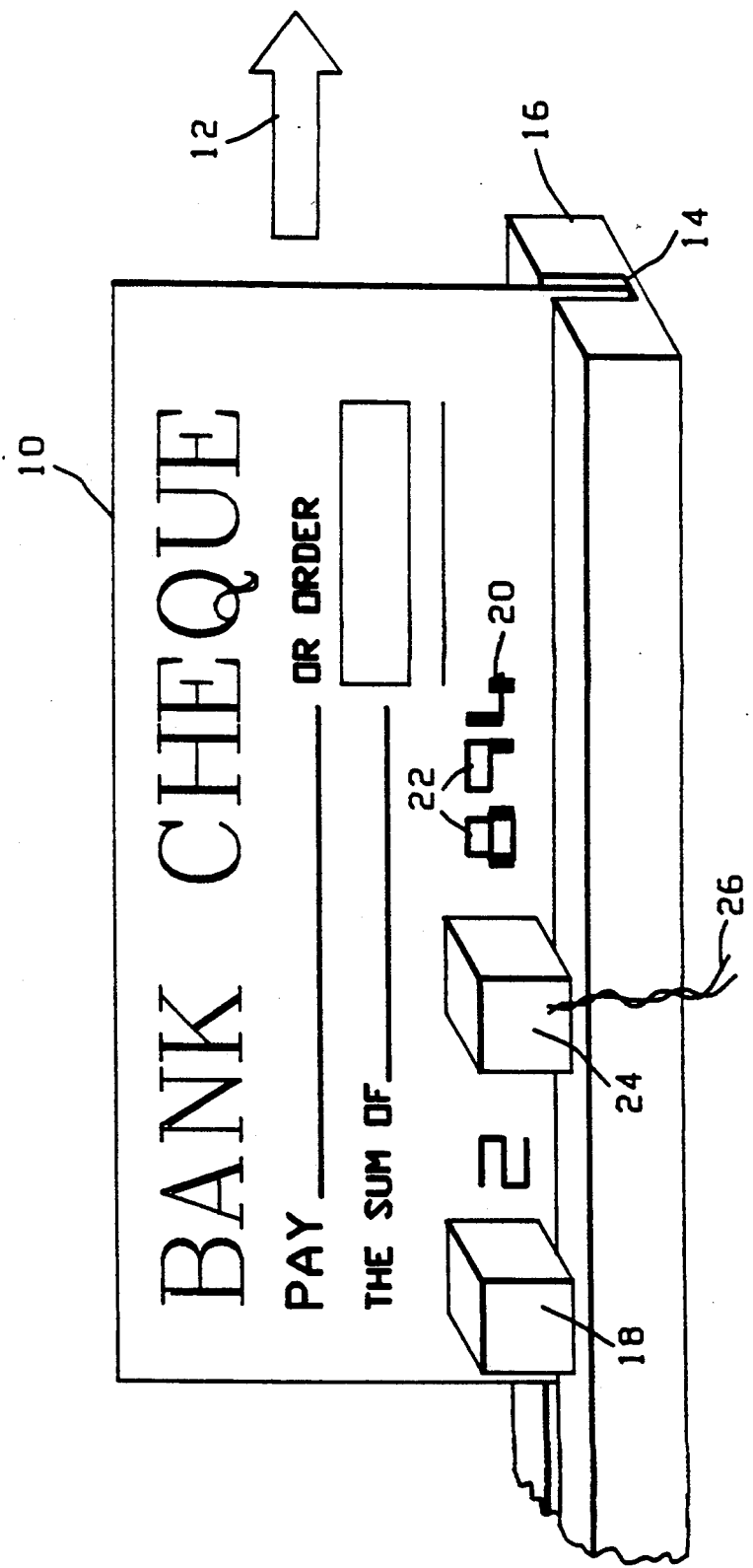
FIG. 1 shows a character sensor in a cheque encoding machine, suitable for use with the present invention.

FIG. 1 shows an exemplary environment wherein the present invention may be used. A cheque 10 or other document, moves as indicated by a first arrow 12 along a slot 14 in a document track 16 passing a magnetising head 18 which magnetises magnetic ink in a row 20 of magnetic characters 22 and thereafter passing a magnetic pick up head 24 deriving signals representative of the rate of change of flux density of the individual magnetic characters 22 and providing that signal on output wires 26. In the present example the magnetic pick up head 24 comprises a single magnetic gap extending vertically (as seen in FIG. 1) and encompassing the entire height of each magnetic character 22. It is to be appreciated that other schemes may be used and that those skilled in the art will be aware of simple modifications for that use.

The cheque 10 is moved along the track 16 by any means known in the art. Belts, pulleys and wheels may all be used and are not part of the present invention.

Figure 2:
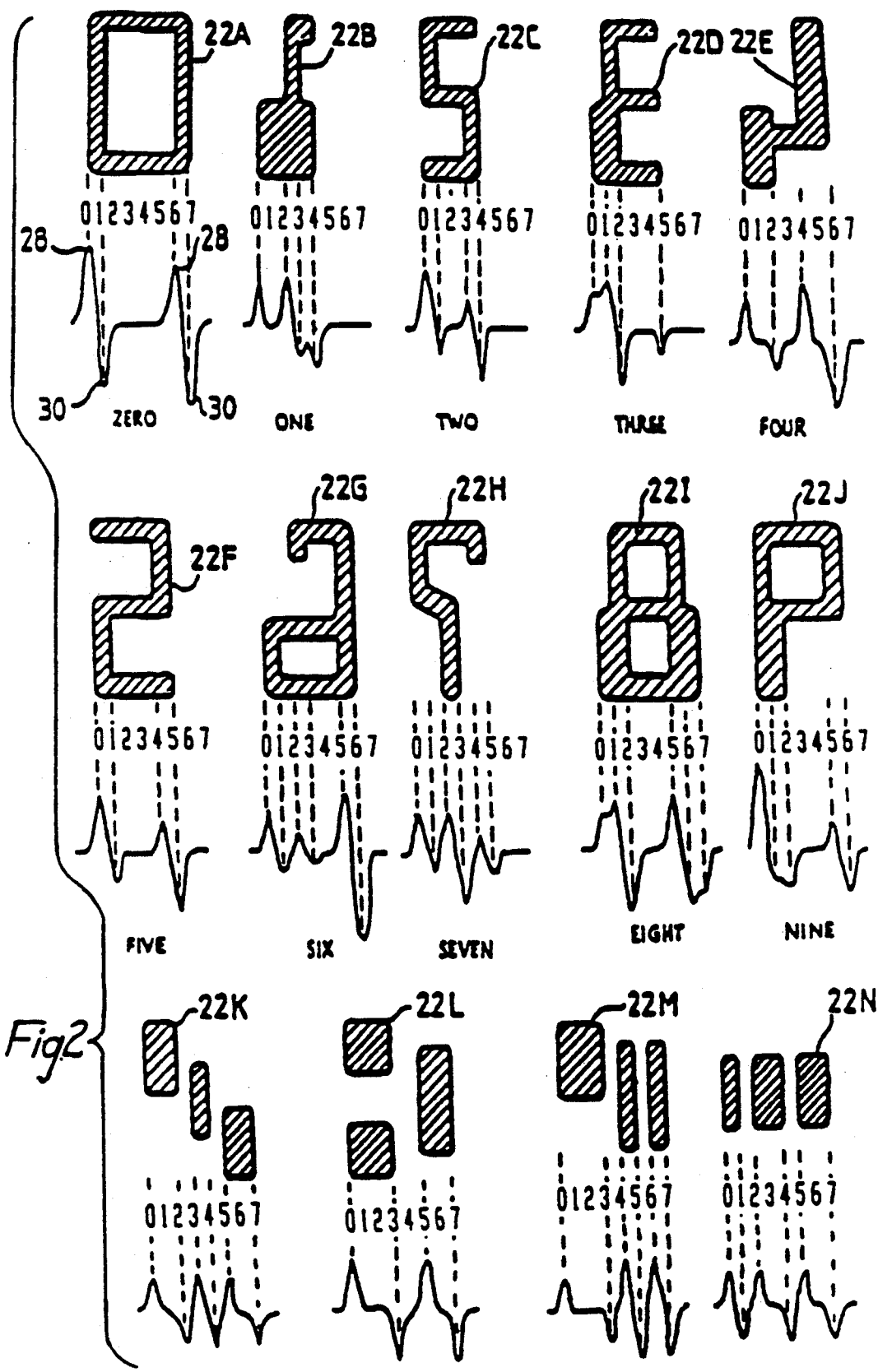
FIG. 2 shows an exemplary character set suitable for use with the present invention.

FIG. 2 shows an exemplary character set for use with the present invention. The characters are shown in mirror image with commencement of scanning time to the left and later times to the right, since this is the way in which the magnetic head 24 encounters the characters. In this example, ten decimal digits 22A-22J are provided, together with four other characters 22K-22N. Those skilled in the art will be aware of other character sets which may equally be used. This particular character set is known as the E13B character set. The row of seven digits immediately beneath each character 22A-22N represents timing epochs within each character. The graph below each character 22A-22N indicates the signal on the output wires 26 derived by the magnetic pick up head 24 from each character 22A-22N as it passes there-beneath. It is seen that each character 22A-22N has a unique signature of peaks comprising positive peaks 28 and negative peaks 30. For simplicity, these negative and positive peaks have been indicated only for the zero character 22A of FIG. 2. It is to be understood that corresponding peaks exist for all of the other characters 22B to 22N.

Figure 3:
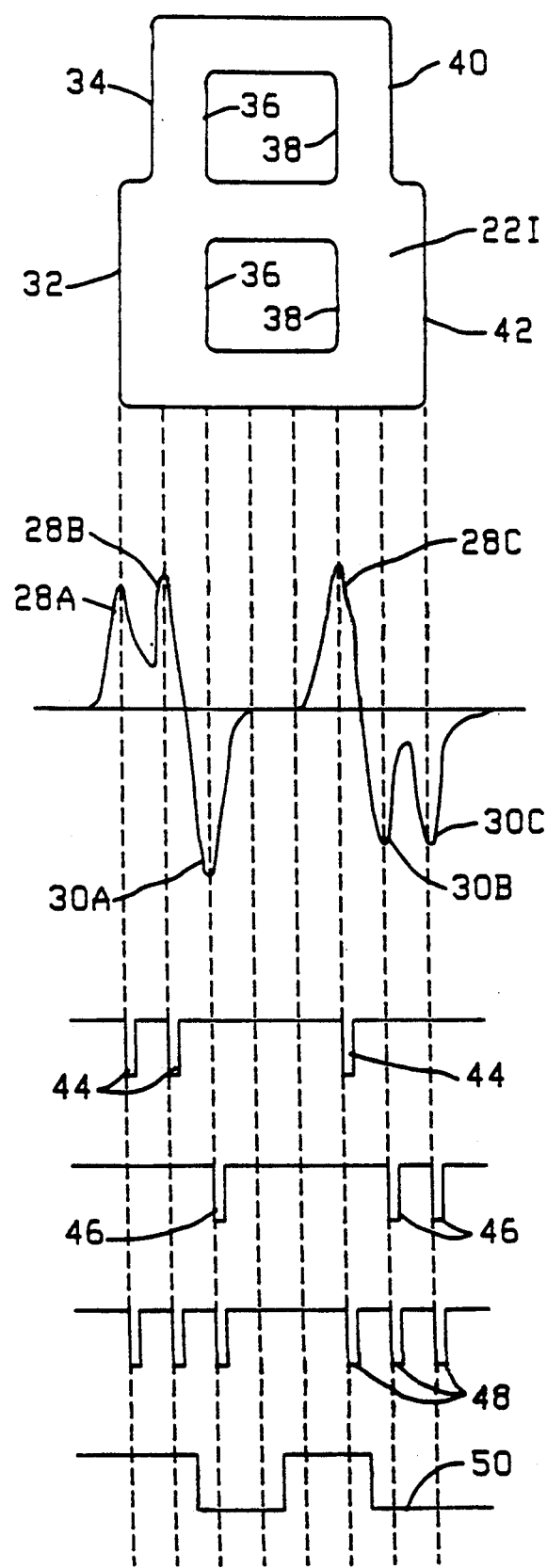
FIG. 3 shows the waveforms derived from one particular character from FIG. 2.

FIG. 3 shows exemplary analogue waveforms and operational wave forms used in the present invention to identify the characters 22A-22N of FIG. 2. In this instance, the character chosen is the FIG. 8 22I of FIG. 2. As the magnetic head 24 scans the character 22I it encounters a first leading edge 32 of the character 22I which produces a first positive peak 28A. Further into the character 22I a second leading edge 34 is encountered, creating a second positive peak 28B.

Thereafter, a simultaneous first trailing edge 36 in both the upper and lower postions of the character 22I creates a first negative peak 30A. A simultaneous third rising edge 38 in both the upper and lower portions of the character 22I then creates a third positive peak 28C. Thereafter, a staggered second 40 and third 42 trailing edges create respectively second 30B and third 30C negative pulses.

Negative logic pulses 44 are created for each positive peak 28A, 28B, 28C. Likewise, negative logic pulses 46 are generated for each negative peak 30A, 30B, 30C. These are combined to provide a stream of negative logic pulses 48 representative of edges 32, 34, 36, 38, 40, 42 in the character 28I. At the same time, the general polarity of the analogue signal is detected, and a sense output 50, being a logic signal indicative of the polarity of the analogue signal on the output wires 26, is also provided.

FIG. 3 is further explained with reference to FIG. 4. The magnetic pick up head 24 provides its signals to an amplifier 52 and a low pass filter circuit 54 whose output 56 is provided firstly to a delay line 58 and secondly to a first input 60 of a first comparator 62. The output 64 of the delay line 58 is coupled to the second input 66 of the first comparator 62. The output of the first comparator 62 is a logic signal indicative, by its polarity, of the sense of the difference between the analogue voltages presented at its first input 60 and its second input 66. Those, skilled in the art, will be familiar with many such comparators 62. Typical, but not restrictive of such devices, are the LM311, and the LM3302, to name but two of many hundreds.

The first comparator 62 provides an output 68 as input to an edge logic circuit or means 70.

A second comparator 72 monitors the output 56 of the low pass filter 54 and provides, in turn, an output 74 to a controller 76. The output 74 of the second comparator 72 is a comparison against zero volts of the polarity of the signal on the output 56 for the low pass filter 54. This corresponds to the signal 50 of FIG. 3.

A third comparator 78 compares the output 56 for the low pass filter 54 against a first reference voltage 80 on its inverting input and provides output 82 indicative by logical polarity of whether or not the output 56 of the low pass filter 54 exceeds the first reference voltage 80. The output 82 of the third comparator 78 is provided as an input to the edge logic circuit 70. The first reference voltage 80 provides a threshold which the output 56 of the low pass filter 54 must exceed before the output 82 of the third comparator 78 provides a logically true output. This threshold eliminates random indication of edges due to noise on baseline signals.

A fourth comparator 84 monitors the output 56 of the low pass filter 54 on an inverting input and compares it against a second, negative reference voltage 86 on its non inverting input. The fourth comparator 84 provides an output 88 indicative by logical polarity whether or not the negative magnitude of the output 56 of the low pass filter 54 exceeds the negative magnitude of the third reference voltage 86. The output 88 of the fourth comparator 84 is provided as an input to the edge logic circuit 70 which provides an interrupt input 90 to the controller 76. In turn, the controller 76, in a manner hereinafter to be described, stores and processes the information provided to it on the output 74 of the second comparator 72 indicative of analogue signal sense, and the timing of signals on the interrupt input 90 from the edge logic circuit 70, to provide indication on an output bus 92 of the identity of the character 22I being scanned.

Figure 4:
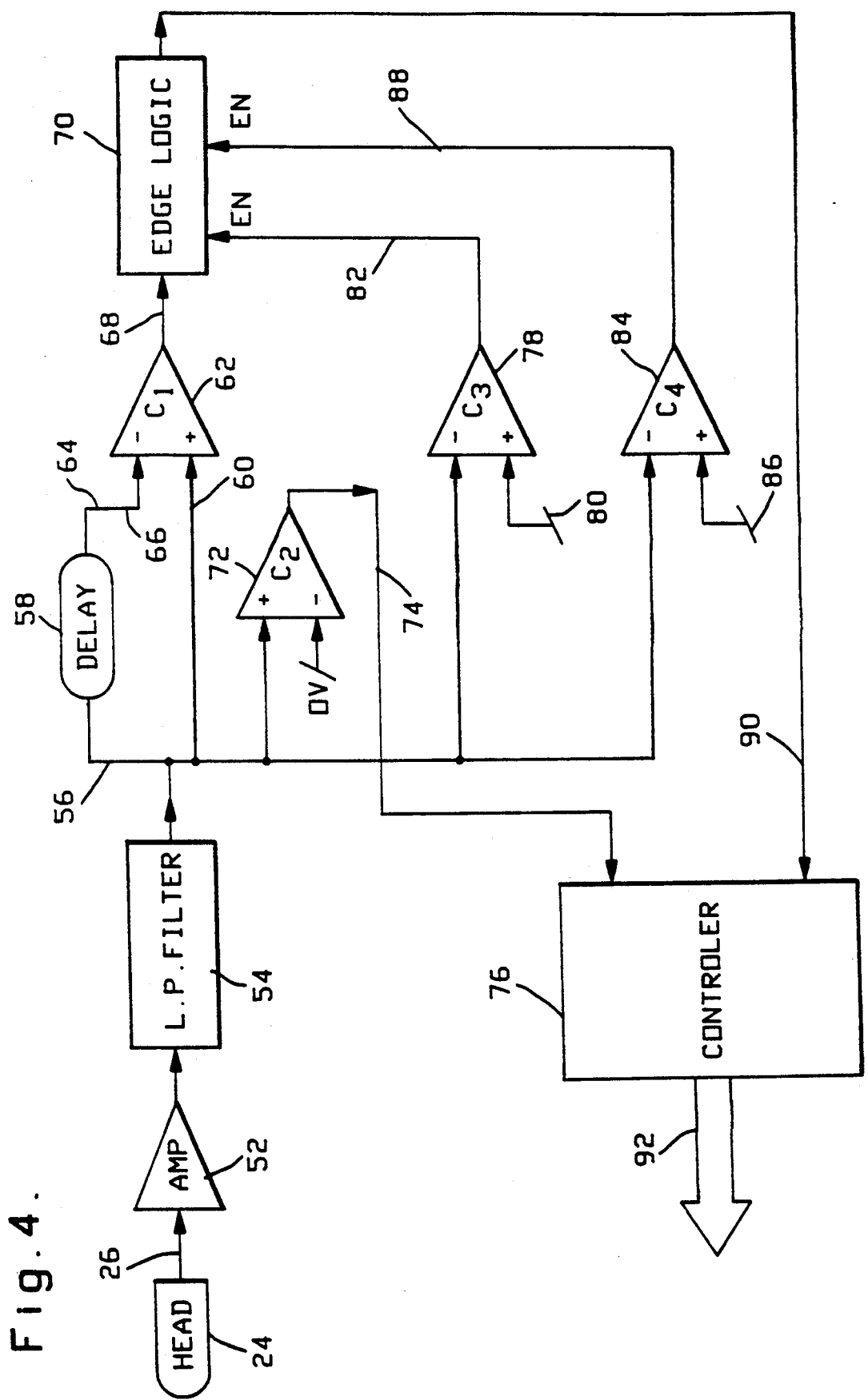
FIG. 4 shows the overall system of the third embodiment of the present invention and particularly shows the analogue portion of the edge detector circuit.
Figure 5:
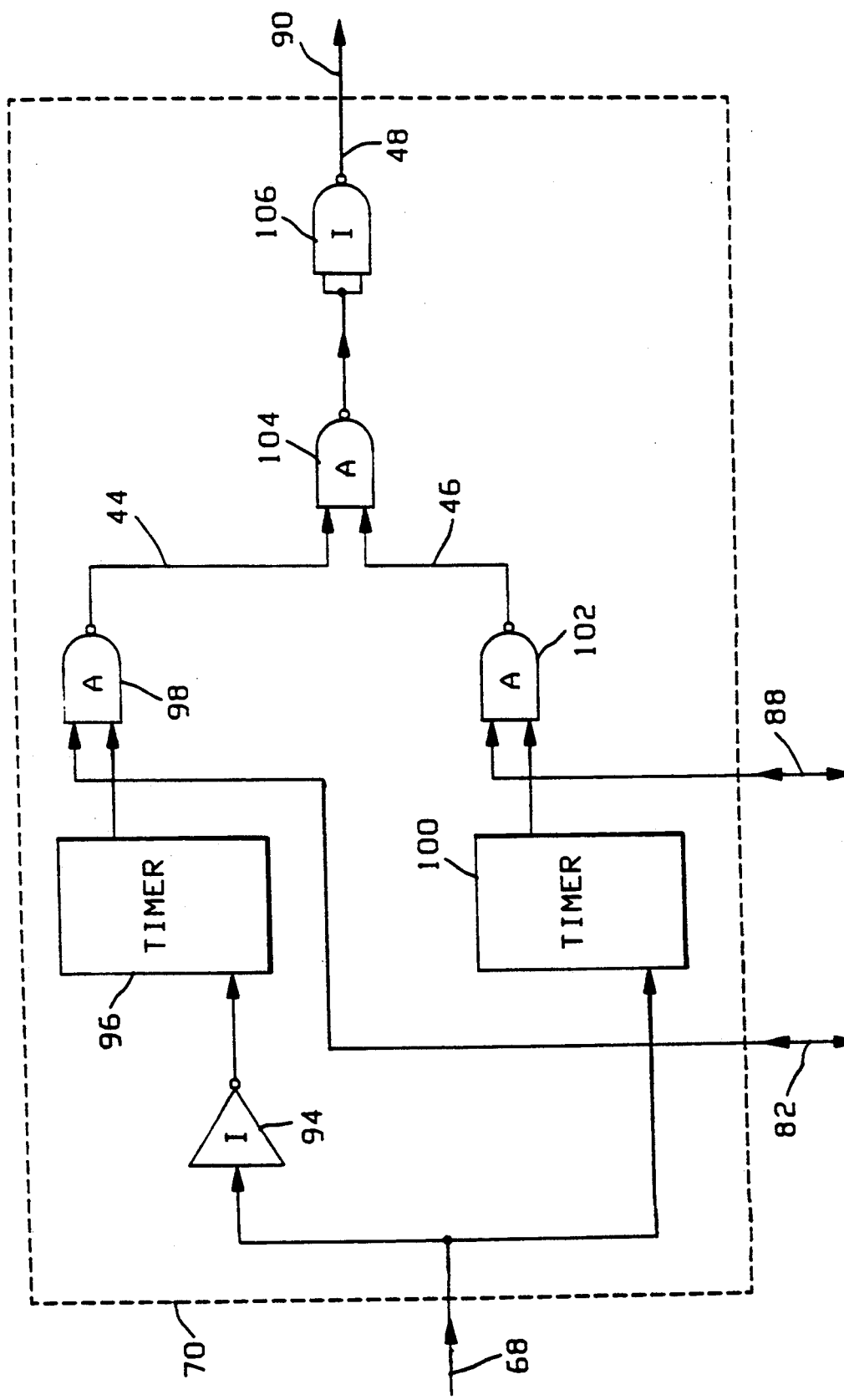
FIG. 5 is a schematic block diagram of the digital portion of the edge detector circuit of FIG. 4.

FIG. 5 is a schematic block diagram of the edge logic circuit 70 of FIG. 4. The output 68 of the first comparator 62 is logically true when the time derivative (that is, the rate of change of voltage with time) of the analogue signal is positive, and logically false when the time derivative of the analogue signal on the output wires 26 is negative. The polarity thus changes from logically true to logically false at each positive peak 28 and from logically false to logically true at each negative peak 30. A first inverter 94 inverts the output 68 of the first comparator 62 to its logically opposite sense.

The output of the first inverter 94 uses its rising edge to clock a first monostable timer 96, providing a short output pulse on each rising edge of the signal from the first comparator 62. The output of the first monostable timer 96 is gated, using a first gate 98, with the output 82 of the third voltage comparator 78 such that the output of the first gate 98 is a representation of the signals 44 of FIG. 3.

The output 68 of the first comparator 62 is applied directly as a triggering input to a second monostable timer 100 whose output, being also a short pulse on each instance of the output 68 of the first comparator 62 going from logically false to logically true, is gated with the output 88 of the fourth comparator 84 is a second gate 102 such that the output of the second gate 102 is a representation of the signals 46 of FIG. 3.

The outputs of the first gate 98 and the second gate 102 are combined in a third gate 104 whose output is inverted by a second inverter 106 to provide the signals 48 of FIG. 3 coupled to the interrupt line 90 sent to the controller 76.

Figure 6:
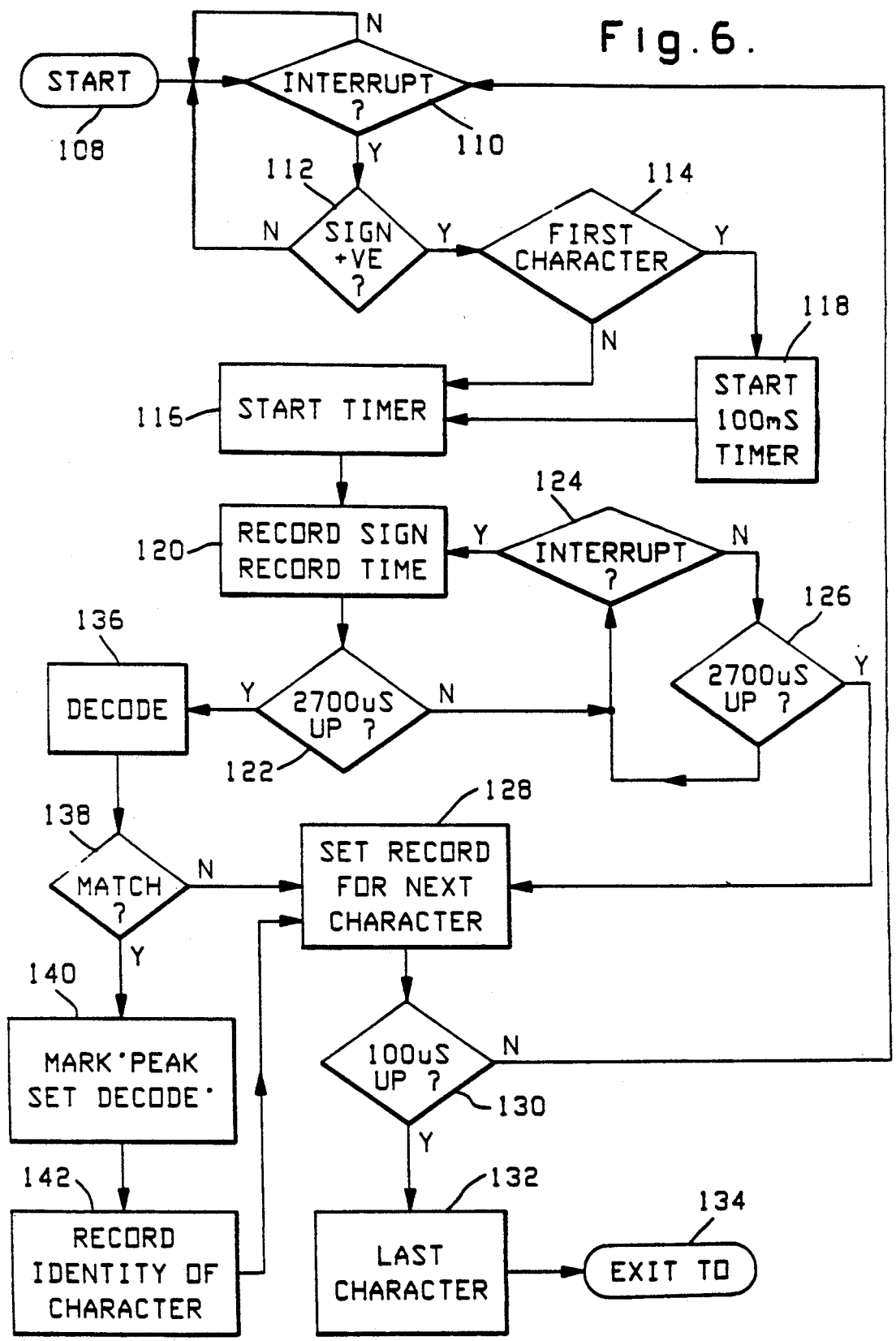
FIG. 6 is a flowchart representing the activity of the controller of FIG. 4 on a first pass attempt at identifying scanned characters.

FIG. 6 is a flowchart of the activity of the controller 76 of FIG. 6. FIG. 4 shows the basic manner of recording edges in the character 22 for later processing.

The recording process is entered from a first start operation 108, passing at once to a first test 110 where the controller 76 waits for an interrupt signal on the interrupt line 90. If no interrupt signal is received, it keeps waiting. If an interrupt signal is received, control is passed immediately to a second test 112 where the controller 76 looks to see if the signal 50 on the output 74 of the second comparator 72 is a positive signal. The first interrupt. at the beginning of a character, is always a positive signal, according to the convention for the preferred embodiment. Those skilled in the art will be aware that the logical polarity could be inverted simply by reversing the output wires 26 or the sense of the magnetising head 18 of FIG. 1.

If the second test 112 does not detect that the interrupt is present during a positive signal, control is returned to the first test 110 where the controller 76 continues to wait for an interrupt. If the second test 112 detects an interrupt on the interrupt line 90 while the sign of the signal is positive, control is passed at once to a third test 114. The third test 114 tests whether the character is the first character in a set. Observing FIG. 1, it is to be perceived that the magnetic characters 22 form a longitudinal array of characters which are to be read. In the third embodiment of the present invention all the characters 22 will have been read within a time of 100 milliseconds. Further, each character will be intercepted by the magnetic pick up head 24 in a time equal to or less than 2,700 microseconds. If the third test 114 detects that the presented character is not the first character in the row 20, control is passed to a first operation 116 which starts a 2,700 microsecond timer. If the third test 114 detects that the character intercepted is the first character on the cheque 10, control is passed to a second operation 118 which starts a 100 millisecond timer. Control is then passed to the first operation 116.

The first operation 116 passes control to a third operation 120 which records the time and the sign on the signal sense line 50 of each edge as it is received. Since each edge operates the interrupt line 90, it is simply a matter of recording the time when the interrupt was received.

The third operation 120 passes control to a fourth test 122 which tests whether or not the 2,700 microsecond timeout has terminated. If the timeout is not terminated, control is passed to a fifth test 124 which waits for a further interrupt. Should an interrupt occur, the fifth test 124 passes control to the third operation 120 which once again records the sign and the time and passes control back to the fourth test 122. If the fifth test 124 does not detect an interrupt, control is passes to a sixth test 126 which checks to see whether or not the 2,700 microsecond time-out has terminated. If not time-out termination has occurred, the sixth test 126 passes control back to the fifth test 124. If the 2,700 microsecond timer has timed out, control is passed to a fourth operation 128 which sets the recording apparatus ready to receive the next character. The fourth operation 128 passes control to a seventh test 130 which tests to see whether or not the 100 millisecond time-out has terminated, indicating that the entire cheque 10 should have passed through the reading station. If the 100 millisecond time-out has not terminated, control is passed back to the first test 110 waiting for the next character. If 100 millisecond time-out has terminated, a fifth operation 132 indicates that the last character has been received, and a first exit 134, from the routine, is used.

If the fourth test 122 detects that the 2,700 microsecond time-out has terminated, control is passed to a sixth operation 136 which is the decoding operation. The decoding operation will be described with reference to FIGS. 7, 8 and 9. The sixth operation 136 passes control to an eighth test 138 which tests to see if a match has been obtained. If no match has been obtained, control is passed to the fourth operation 128. If a match has been obtained control is passed to a ninth test 140 which marks the set of peaks as having been decoded. The identity of the character is then recorded in a tenth operation 142 and ultimately provided on the comparator output bus 92. The tenth operation 142 passes control to the fourth operation 128.

Figure 7:
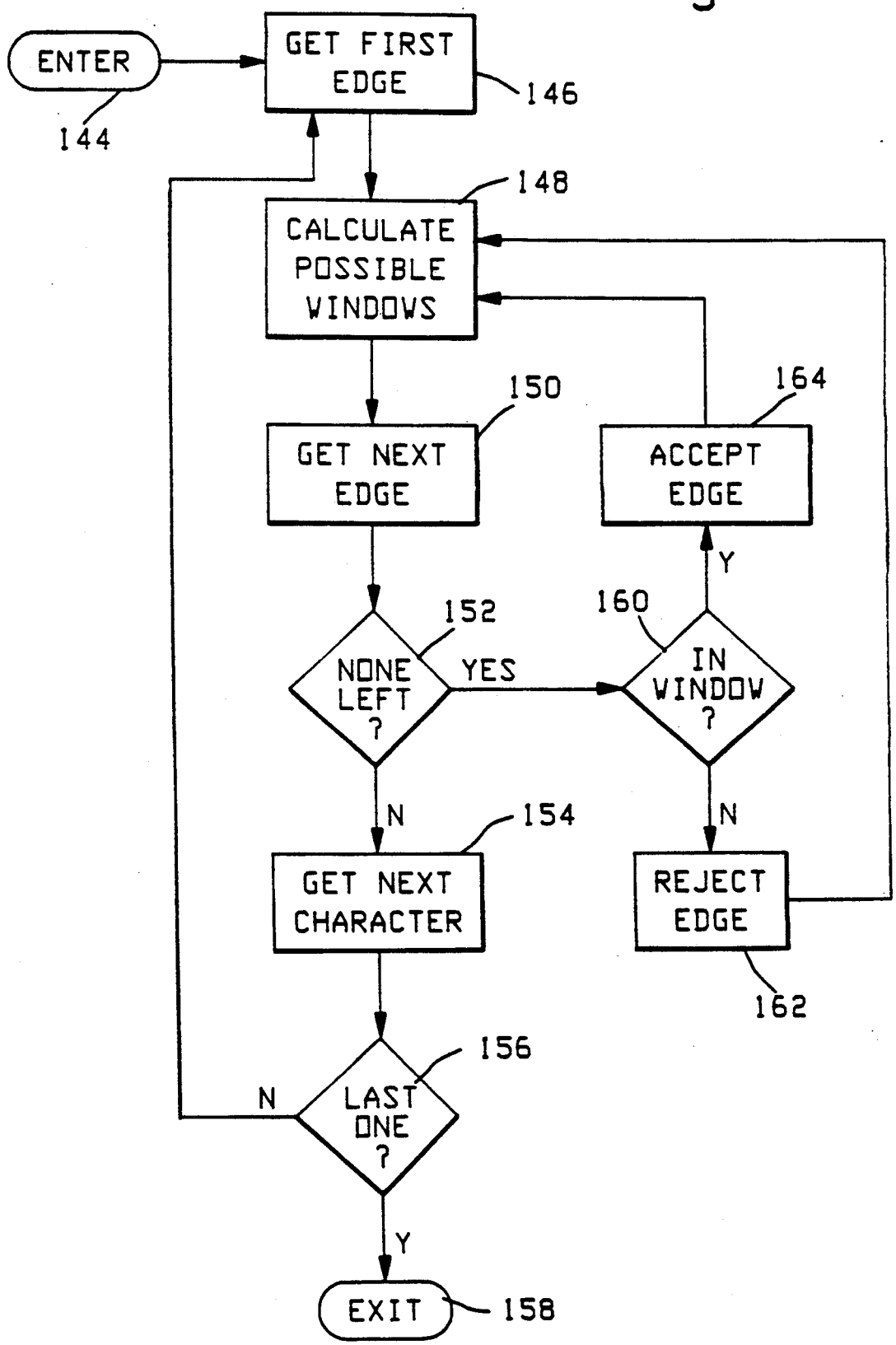
FIG. 7 is a flowchart indicating the activities of the controller when interpreting whether or not a detected edge is part of a character.

FIG. 7 indicates a first stage of decoding, being the sixth operation 136 of FIG. 6. A second start operation 144 provides entry to the decode routine 136. Control is passed to an eleventh operation 146 where the first edge (i.e., the time of the first interrupt) is retrieved from memory. Control is then passed to a twelth operation 148 which calculates a possible number of timing windows for the next subsequent edges. As will be seen from FIG. 2, if a valid character is received, the edges 48 will appear at pre-determined times. The windows are calculated on the basis of a pre-determined percentage error. In this instance, the error is taken to be plus or minus 10% on speed. Those skilled in the art will realise that the error can be calculated on a greater or lesser percentage basis.

The twelfth operation 148 passes control to a thirteenth operation 150 which retrieves the next edge from the memory. The thirteenth operation 150 then passes control to a tenth test 152 which checks to see if there are any edges left to be retrieved from the memory. If no edges are left, control is passed to a fourteenth operation 154 which attempts to retrieve any further characters stored in the controller memory. An eleventh test 156 checks to see whether or not the last retrieved character was the final one. If the last retrieved character was the final character in a stored set, control is passed to a second exit 158 which passes via one, the other or both of the flowcharts in FIGS. 8 and 9 and thereafter to the ninth operation 140 of FIG. 6.

If the tenth test 152 detects that there are residual edges to be retrieved, it passes control to a twelfth test 160 which test to see if the last received edge was in a valid window. If the last received edge was not in a valid window, the twelfth test 160 passes control to a fifteenth operation 162 which rejects the last received edge as being invalid and does not thereafter employ it for character recognition. Control is passed back to the twelfth operation 148.

If the twelfth test 160 does detect that the last received edge was indeed in a valid window, control is passed to a sixteenth operation 164 which accepts the last received edge for the purpose of character recognition. The sixteenth operation 164 then passes control back to the twelfth operation 148.

Figure 8:
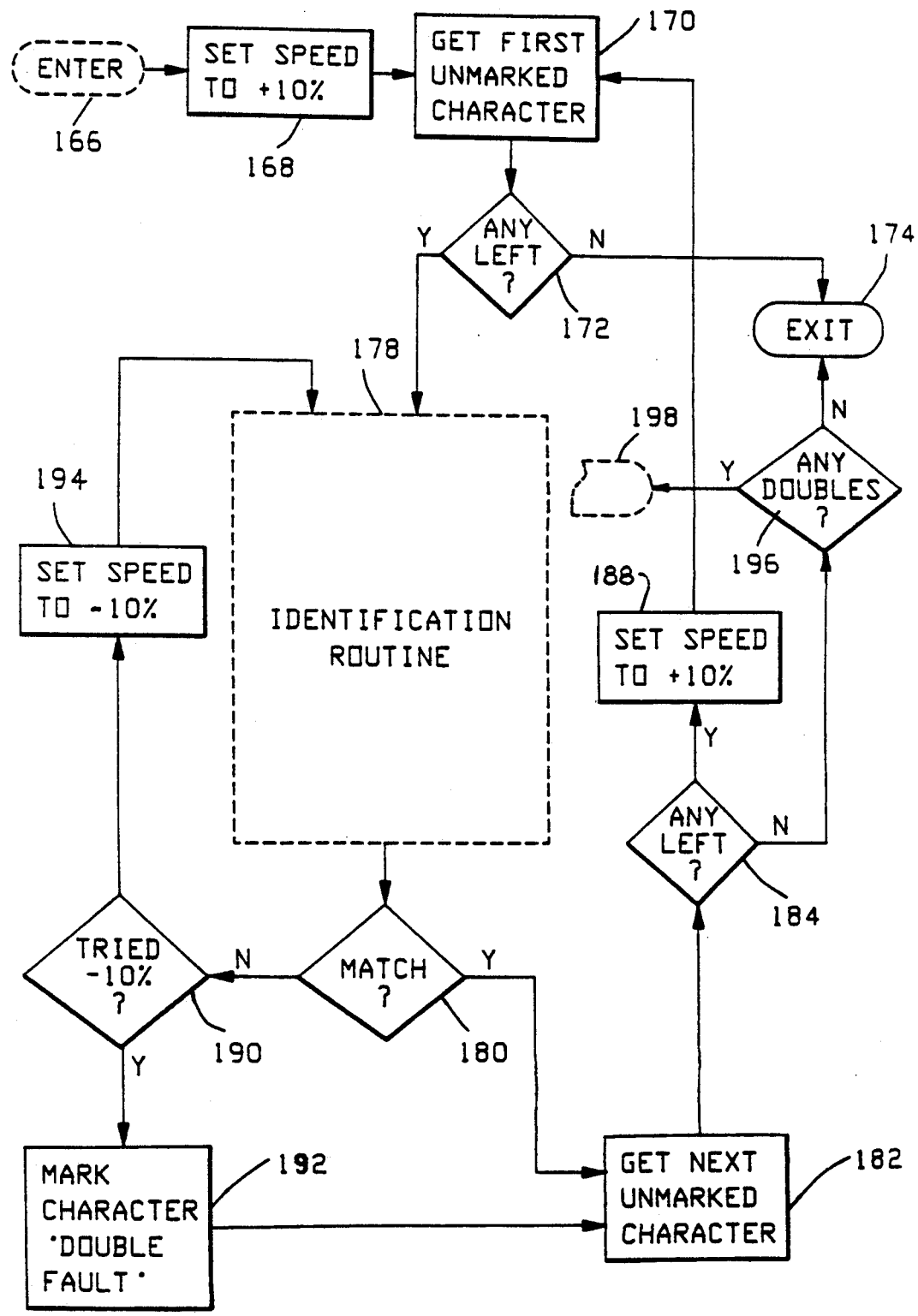
FIG. 8 is a flowchart of the activity of the controller when attempting a second-pass identification of any characters not previously identified.

In passing from the flowchart of FIG. 7 to the flowchart of FIG. 8, it is to be presumed that the list of accepted peaks from FIG. 7 have been tested against stored templates. Those templates which have found a match are marked but those templates which have not found a match leave the stored set of valid, accepted edges unmarked.

The flowchart of FIG. 8 is entered, as described, via a third entry operation 166 which passes control to a seventeenth operation 168. The seventeenth operation 168 sets the speed of passage of the document 10 past the magnetic pick up head 24 as if it were 10% fast. The windows, as previously described with reference to FIG. 7, are recalculated, and any valid peaks included. This is done in an eighteenth operation 170 for each unmarked character. A thirteenth test 172 then checks to see whether or not there are any unmarked characters left. If there are no unmarked characters left, the thirteenth test 172 passes control to a third exit 174 which exits to the flowchart of FIG. 9. Should the thirteenth test 172 detects that there are unmarked characters left, control is passed to the general identification routine 178 which attempts to match the modified character record against the templates stored. The identification routine is tested by a fourteenth test 180 to see whether a match has been found. If a match has been found, a nineteenth operation 182 gets the next unmarked character and is tested by a fifteenth test 184 to see if there are any unmarked characters left. If there are unmarked characters left, control is passed to the eighteenth operation 170, via a twentieth operation 188 which again sets the speed to plus 10%.

If the fourteenth test 180 indicates that the identification routine 178 has not detected a match, control is passed to a sixteenth test 190 which checks whether or not the minus 10% speed variant has been tried. If the sixteenth test 190 does detect that the minus 10% speed variant has been tried, control is passed to a twenty-first operation 192 which marks the retrieved character (that is, set of recorded peaks) as a double fault. Control is then passed back to the nineteenth operation 182.

If the sixteenth test 190 indicates that the minus 10% speed variant has not been tried, a twenty-second operation 194 recalculates all of the timing windows and acknowledges peaks in the timing windows according to the same method used in the seventeenth operation 168. Control is then passed back to the general identification routine 178.

Should the fifteenth test 184 detect that there are no characters left to retrieve, control is passed to a seventeenth test 196 which checks to see whether or not any characters have been marked "double fault" by the twenty-first operation 192. If no characters have been marked "double fault", control is passed to the third exit 174 which exits back to the eighth test 138 in FIG. 6. If double fault characters have been detected, the seventeenth test 196 passes control to a third entry operation 198 for the flowchart of FIG. 9.

Figure 9:
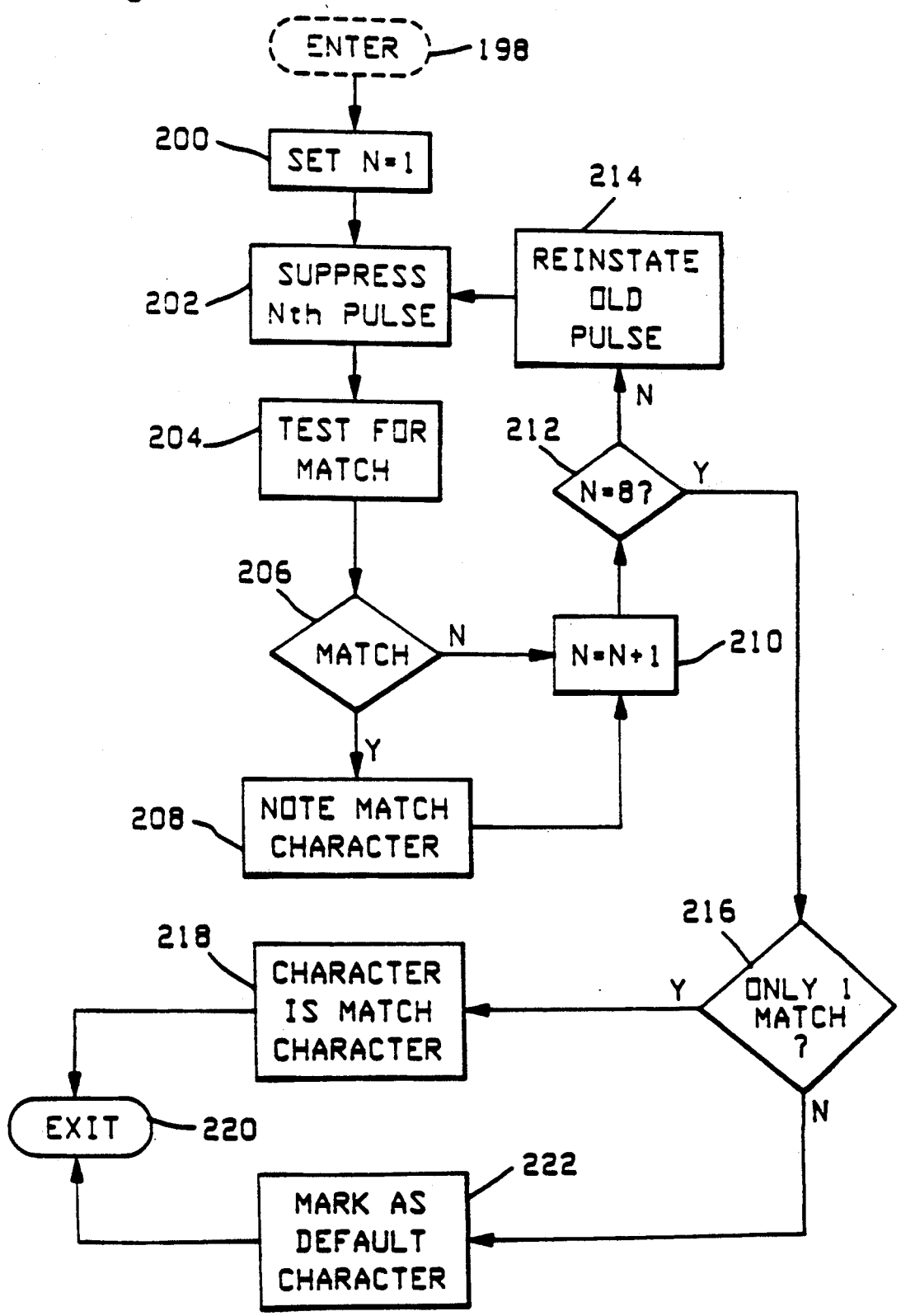
FIG. 9 is a flowchart of the activities of the controller when suppressing edges in an attempt, using a third method, to identify unidentified characters.

FIG. 9 shows a further operation used to identify characters scanned by the magnetic pick up head 24. The entry routine 198 leads directly to a twenty-third operation 200 which sets a dummy variable N equal to one. Thereafter, a twenty-fourth operation 202 suppresses the Nth pulse stored for the scanned character. This is done on the assumption that an erroneous pulse has been received. Thereafter, control is passed to a twenty-fifth operation 204 which attempts to match the suppressed-pulse character against the templates. An eighteenth test 206 checks to see if any match has been found. If a match has been found, the eighteenth test 206 transfers control to a twenty-sixth operation 208 which marks and notes which template against which a match was found. The twenty-sixth operation then passes control to a twenty-seventh operation 210 where the dummy variable N is incremented by one. If the eighteeth test 206 does not find a match with the Nth pulse suppressed, control is passed directly to the twenty-seventh operation 210 where the pulse to be suppressed is incremented by incrementing the dummy variable.

The twenty-seventh operation 210 passes control to a nineteenth test 212 which checks to see if the dummy variable N has been incremented to its upper limit 8. If the dummy variable N has not reached its upper limit, control is passed to a twenty-eighth operation 214 which reinstates the previously suppressed pulse and passes control to the twenty-fourth operation to suppress the next subsequent pulse.

If the nineteenth test 212 indicates that the dummy variable N has reached its upper limit, control is passed directly to a twentieth test 216 which checks to see if only one match has been found for each character as each of its pulses has been suppressed. If only one match has been found, the single match character is indicated as the identified character in a twenty-ninth operation 218. Control is then passed to a fourth exit 220 back to the eighth test 138 of FIG. 6.

If the twentieth test 216 finds that there was either no match, or more than one match, found as each pulse in the character was suppressed in turn, a thirtieth operation 222 marks the character as a default character and passes control to the fourth exit 220.

It is to be appreciated that the routine of FIG. 9 can be applied with both the plus 10% and minus 10% speed variations of FIG. 8 to see if a match can be found.

It is also to be appreciated that intensity-sensitive apparatus, such as optical apparatus, may be used provided some form of differentiator is placed in series with the low pass filter 54 of FIG. 4.

What we claim is:

1. An apparatus for identifying a scanned character from among a predetermined set of characters, said apparatus comprising;
   edge detector means 70 for detecting and generating a first electrical output signal 48 indicative of the position of the edges in the scanned character;
   signal level detector means 72 for detecting and generating a second output signal 50 indicative of the polarity of the rate of change of intensity of the scanned character with respect to position;
   controller means 76 coupled to said output signals and being operative to generate a character record signal which includes the position of each edge and the polarity of the rate of change of intensity of a predetermined reference character;
   said controller means 76 comprising a stored set of character record signals, one for each respective one of the characters in said predetermined set of characters; and
   said controller means being operative to compare each stored character record signal with said output signals and to provide an indication of that character from said predetermined set of characters with whose signals the output signals match.

2. An apparatus according to claim 1 wherein said controller means, should no character record signal be found to match said output signals, is operative to apply a correction to the position of edges in said output signals on the assumption of a predetermined amount of mispositioning of the edges in the output signals to provide modified output signals; said controller means being operative thereafter to compare the modified output signals with each stored character record signal and to provide an indication of that character, from said predetermined set of characters with which the modified output signals match.

3. An apparatus according to claim 2 wherein, should no character record signal be found to match said modified output signals, said controller means is operative to suppress, in turn, each edge in said output signals to create a set of a first type of altered output signals; said controller means being operative to compare each first type of altered output signals with each stored character record signal, and to store an indication of those character record signals with which a match is found, and to provide an indication of any character, from said predetermined set of characters, with whose character record signal there is found to be the only match, and to provide an indication of no match being found if no character record signal is found to match or if more than one character record signal is found to match.

4. An apparatus according to claim 3 wherein, should no character record signal be found to match any of the set of said first type of altered output signals, said controller means is operative to suppress, in turn, each edge in said modified output signals to create a set of a second type of altered output signals; said controller means being operative to compare each second type of altered output signals with each character record signal, and to store an indication of those character record signals with which a match is found, and to provide an indication of any character, from said predetermined set of characters, with whose character record signal there is found to be the only match, and to provide an indication of no match being found if no character record signal is found to match or if more than one character record signal is found to match.

5. An apparatus according to claim 1 wherein, should no character record signal be found to match said output signals, said controller means is operative to suppress, in turn, each edge in said output signals to create a set of a first type of altered output signals; said controller means being operative to compare each first type of altered output signals with each character record signal, to store an indication of those character record signals with which a match is found, and to provide an indication of any character, from said predetermined set of characters, with whose character record signal there is found to be the only match, and to provide an indication of no match being found if no character record signal is found to match or if more than one character record signal is found to match.

6. An apparatus according to claim 1 wherein said controller means is operative, on detection of a first edge in the scanned character, to calculate a first positional window wherein a second edge may properly be found; said controller means acknowledging as a confirmed second edge only a second edge which is detected within said first positional window.

7. An apparatus according to claim 6 wherein said controller means is operative to use the detected position of each edge in the scanned character as a starting point for calculating subsequent positional windows wherein a subsequent edge may properly be located; a next subsequent edge being acknowledged as a confirmed subsequent edge if and only if it falls within a subsequent positional window.

8. An apparatus according to claim 7 wherein said controller means further re-calculates said positional windows and acknowledges all edges found to be in said re-calculated positional windows.

9. An apparatus according to claim 1 wherein said scanned character is scanned by movement past said edge detector means and said controller means is operative to store signals and calculate positions in terms of the time of passage of edges past the edge detector means.

10. An apparatus according to claim 1 wherein said scanned character is a magnetic character, and wherein magnetic flux density represents the intensity of the scanned character.

11. An apparatus according to claim 1 wherein said scanned character is optical, and wherein gray level light intensity represents the intensity of the scanned character.

12. An apparatus according to claim 9 wherein said edge detector means includes a logic comparator coupled to receive a representation of the intensity of the scanned character and further coupled to receive a delayed representation of the intensity of the scanned character, and said logic comparator being operative to provide a logical output indicative by polarity of the sense of the difference between said representation of the intensity of the scanned character and said delayed representation of the intensity of the scanned character.

* * * * *